Oct. 14, 1941. J. J. MIZER Re. 21,923

LIFTING MECHANISM

Original Filed March 27, 1939

INVENTOR
Joseph J. Mizer.

BY
Harness, Dickey & Pierce.
ATTORNEYS.

Reissued Oct. 14, 1941

Re. 21,923

UNITED STATES PATENT OFFICE 21,923

LIFTING MECHANISM

Joseph J. Mizer, Racine, Wis., assignor to Walker Manufacturing Company of Wisconsin, a corporation of Wisconsin Original No. 2,168,489, dated August 8, 1939, Serial No. 264,355, March 27, 1939. Application for reissue April 12, 1940, Serial No. 329,357

7 Claims. (Cl. 254—133)

The present invention relates to lifting mechanisms, and in the particular embodiment herein disclosed, provides an improved lifting mechanism particularly adapted for use in connection with automobiles.

It will be understood that the lifting or jack mechanisms conventionally supplied at the present time as part of the equipment of automobiles, for use in making tire or wheel changes, are of two general types; namely, those adapted to be applied to an unsprung part of the vehicle, such as an axle or spring pad, and those which are adapted to be applied to a sprung part of the vehicle, such as the bumper. The former type is advantageous from the standpoint that, being applied to an unsprung part of the vehicle, the jack or lifting device is required to be elevated only to the extent that it is desired to elevate the wheel, but is disadvantageous in connection with present day automobile designs, because of the increasing use of body designs which overhang the front and rear axle structures to a substantial extent, and so make it extremely difficult not only to "spot" the jack under the unsprung part but also to elevate it after it has been so located. The latter general type will be recognized as being advantageous from the standpoint that the jack may readily be applied to a bumper or other exposed part of the vehicle, but this type is particularly disadvantageous from the standpoint that an exceedingly large elevating movement of the jack is required to produce the relatively small required lifting movement of the wheel, since the lifting movement of the wheel does not begin until the vehicle spring structure has become relaxed.

There is, therefore, a growing demand in the automotive industry for a lifting or jack mechanism which overcomes the above objectionable features of the present jack structures, while at the same time retaining the advantageous features thereof. With these considerations in view, the present invention provides what may be called a two-part jack mechanism, one part being adapted to be applied to an exposed unsprung part of the vehicle and the other part being a retaining or holding member adapted to be positioned below another unsprung part of the vehicle so as to retain the wheel in elevated position.

Further objects of the present invention are to provide a lifting mechanism of the above indicated character, embodying a lifting member adapted to be applied to the felloe, rim, or like projecting part of a wheel so as to elevate the same, and embodying a supporting column or other member adapted to be seated beneath another unsprung part of the vehicle to retain the same in elevated position, so as to enable the lifting member to be removed, after which the wheel may be replaced; and to in general provide a jack mechanism which may be economically manufactured, which requires little storage space, and which in use, is extremely simple and effective.

With the above as well as other objects in view, which appear in the following description and in the appended claims, a preferred but illustrative embodiment of the invention is shown in the accompanying drawing, throughout the several views of which corresponding reference characters are used to designate corresponding parts, and in which:

Figure 1:
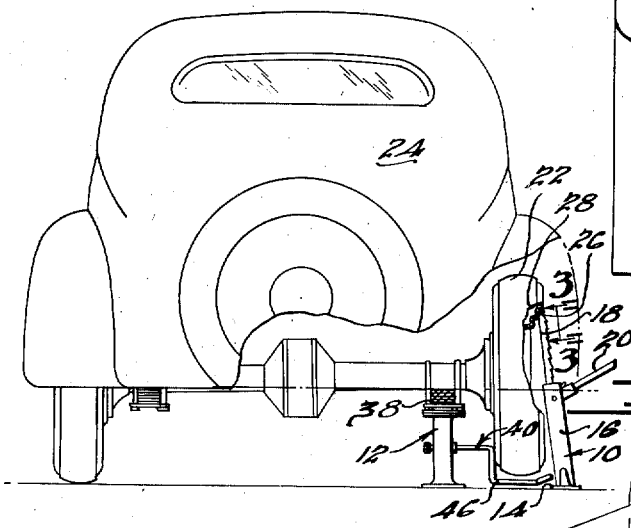
Figure 1 is a view showing one embodiment of the invention as applied to a rear vehicle wheel.
Figures 3, 4:
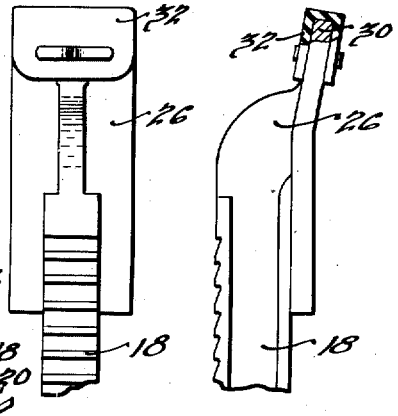
Fig. 3 is a fragmentary view, taken along the line 3—3 of Fig. 1, showing the preferred construction of the lifting member.
Fig. 4 is a view corresponding to Fig. 3, but in side elevation.
Figure 5:
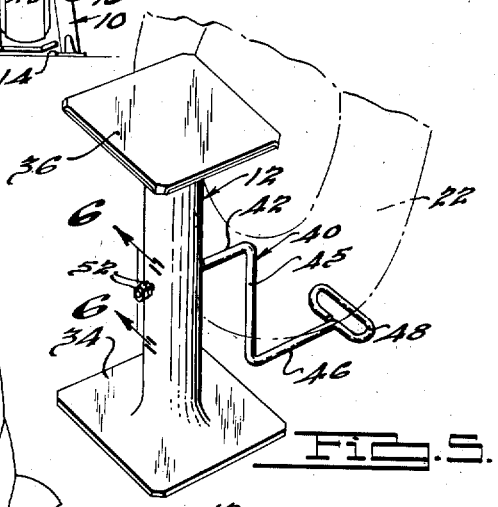
Fig. 5 is a view in perspective of a preferred construction of holding member.

In its present embodiment, the lifting mechanism comprises generally a lifting member 10 and a holding member 12. Except in the respects which particularly adapt it to its present use, the lifting member 10 may be of generally conventional construction, and is herein illustrated as comprising an enlarged base 14, adapted to rest upon the ground or other supporting surface, a housing portion 16, and a lifting column 18 of the ratchet type. It will be appreciated that mechanism responsive to movement of the handle 20 may be disposed within the housing 16, so that successive up and down movements of the handle 20 may be caused to either raise or lower the lifting column 18.

As previously mentioned, it is proposed, in accordance with the present invention, to effect the jacking or lifting operation by first applying the lifting member 10 to a readily accessible unsprung part of the vehicle and more specifically it is proposed to apply the head of the lifting column 18 to a part of the wheel 22 associated with the vehicle 24. In accordance with presentday practice, wheel constructions generally comprise a hub structure, a felloe and an outer rim, the felloe and hub structures being connected together by means of a web which may or may not be provided with cut-outs to define spoke-like elements. In these constructions, the felloe or the rim or both extend laterally outwardly from the web portion, thus providing a relatively substantial shoulder. In the present instance, it is preferred to apply the head of the lifting column 18 directly to the shoulder thus provided, and this relation is shown in Fig. 1, in which the head 26 is seated against a shoulder 28 constituted by the laterally outwardly projecting rim. To adapt it for this purpose, the head 26 of the lifting column 18 is formed to have an upwardly projecting nose 30 which may, as illustrated, be provided with a protective sheath 32 of rubber or the like, so that the application thereof to the wheel structure does not mar or deface the latter. It will be noted that base 14 and housing 16 of the lifting member 10 are so connected together that the housing 16 and column 18 extend upwardly from the base 14 at an angle. This relationship enables the base 14 to be positioned in freely spaced relation to the lower portion of the tire while at the same time enabling the head of the column 18 to be placed in operative relation to the upper portion of the wheel structure as described above.

The holding member 12 is herein illustrated as being formed as a column of fixed length, having an enlarged base 34, and a correspondingly enlarged head 36. It will be appreciated that the length of the holding member 12 is such that when it is placed beneath an associated unsprung part of the vehicle, it holds such part at a sufficient elevation to enable the associated tire 22 to be freely removed and replaced. In the present instance, it is preferred to seat this holding member 12 directly beneath the spring shackle 38, in the relation shown in both Figures 1 and 2 in connection with a rear axle structure. It will be understood that, in applying the invention to vehicles having independent wheel suspensions, the member 12 is seated beneath an "unsprung" part of the suspension for the corresponding wheel.

In order to facilitate the locating of the holding member 12 beneath the associated part of the vehicle, it is preferred to provide the handle 40, the shank 42 whereof is adapted to pass through openings 43 and 44 provided therefor in the wall of the column portion of the member 12. In view of the degree to which present day body structures overhang the unsprung parts of the vehicle, it is frequently difficult to readily see the unsprung part beneath which the member 12 is to be seated. To overcome this difficulty, a feature of the present invention resides in offsetting the handle 40 so as to define a gauge portion 45, which lies between the column-engaging shank 42 and the handle portion 46. The handle portion 46 of course terminates in a convenient grip 48. The proportioning of the handle is such that when the holding member 12 is seated beneath the associated unsprung part of the vehicle, the gauge portion 45 extends in vertical abutting relation to the inner wall of the tire, and the handle portion 46 extends outwardly from under the tire at approximately the center of the wheel. In order to form a connection between the handle 40 and the holding member 12 by virtue of which the latter may be moved both forwardly and rearwardly of the vehicle and also transversely of the vehicle by means of the handle, it is preferred to provide the handle with a shoulder 50 which abuts one wall of the column and, if desired, one or more nuts such as 52 may be removably provided on the extreme end of the handle. Also, it is preferred to provide the handle with a pin 54 which projects into an opening 56 in one wall of the column. It will be understood that when the pin 54 is withdrawn from the opening 56, the handle 40 may be freely rotated relative to the holding member 12, but that when the pin 54 is seated in the opening 56, such rotation is prevented.

Figure 2:
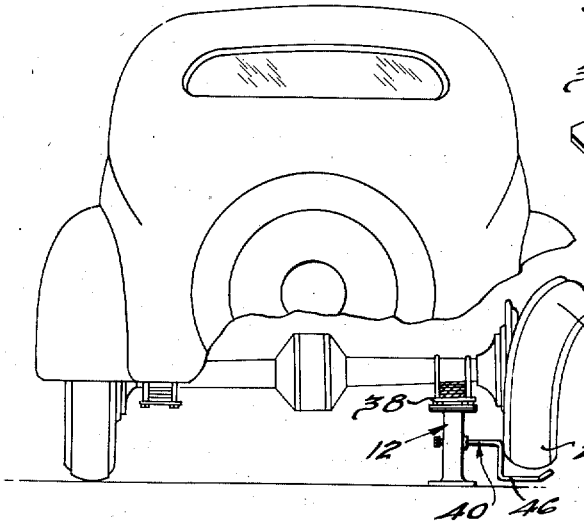
Fig. 2 is a view corresponding generally to Fig. 1, showing the lifting member removed, so as to permit removal of the tire.
Figure 6:
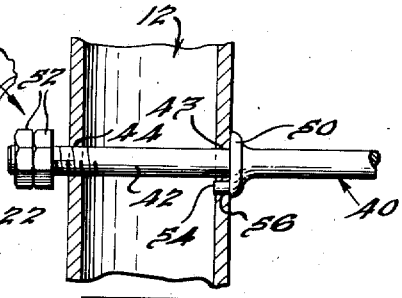
Fig. 6 is a view taken along the line 6—6 of Fig. 1.

Considering now the preferred manner of utilizing the above described mechanism, it will be appreciated that the initial step in lifting the vehicle wheel, so as to permit replacement of the tire associated therewith, the head 26 of the lifting member 10 may be positioned beneath its associated rim portion 28 and a lifting force applied to the column 18, so as to lift the wheel above the ground to a degree somewhat in excess of that required to permit ready removal and replacement of the tire. With the wheel thus elevated, the holding member 12 may be slid underneath the car to a position in which the enlarged head 36 thereof is in registry with the corresponding part of the axle structure, shown herein as the spring shackle 38. It will be understood that the holding member 12 may be conveniently positioned beneath the cooperating unsprung part by grasping the grip portion 48, with the gauge portion 46 vertical and with the pin 54 in the opening 56, and thereafter moving the column 12 forwardly, by means of the handle, until such a time as the handle 48 projects upwardly from under the tire at approximately the center thereof. The handle may finally be moved transversely so as to bring the gauge portion 46 into abutting relation to the wall of the tire. Due to the enlarged size of the head 36, some little latitude is permissible, so as to allow for variations in the accuracy with which the gauge portion 46 is positioned. With the holding member 12 thus positioned, the lifting column 18 may be lowered, so as to release the lifting member 10, after which, as shown in Figure 2, the tire may readily be removed and replaced. Following the replacement of the tire 22, the holding member 12 may be removed by rocking the vehicle 24 off of it, or by again raising the wheel by means of the lifting member 10 so as to permit easy withdrawal of the holding member 12.

While only one specific embodiment of the invention has been described in detail, it will be appreciated that various changes in the form, number, and arrangement of parts may be resorted to without departing from the spirit and scope of the invention.

What is claimed is:

1. In a wheel lifting mechanism for association with an unsprung part of a vehicle having a body portion which overhangs said unsprung part, said unsprung part being positioned inwardly of the vehicle from the wheel, a column adapted to be seated beneath said unsprung part, and handle mechanism operable to position said column beneath said unsprung part, said handle mechanism being formed so as to extend underneath the wheel from a position outwardly of the wheel to said column, and said handle mechanism having an offset part spaced from the column in such relation that when the column is properly positioned beneath the unsprung part, the offset portion substantially abuts a side wall of a tire associated with the wheel.

2. A lifting device for a vehicle wheel, said wheel having an outwardly projecting part, comprising a base adapted to rest upon a supporting surface, a substantially linear column carried by the base and extending inclinedly upwardly therefrom at a fixed angle thereto, a head carried by the column at the top of the column, said head having an upwardly directed nose-like part immediately adjacent the axis of the column but offset therefrom on the side toward which the column is inclined and formed to hook beneath said projecting part, the inclination of said column being just sufficient so that when said base is positioned immediately adjacent the base of a tire associated with said wheel with the inclination toward the wheel said inclination brings said wheel engaging nose like part under and in lifting relation to said projecting part of the wheel, and means operating between said base and column for raising said head and column along the axis of the column so as to lift said wheel.

3. A lifting device for a vehicle wheel, said wheel having an outwardly projecting part associated therewith, comprising a base adapted to rest upon a supporting surface, a substantially linear column carried by the base and extending upwardly therefrom, a head carried by the column, said head having an upwardly directed nose-like part immediately adjacent the axis of the column but offset therefrom and formed to hook beneath said projecting part, said base, column and head being so related to each other that when said base is positioned on said surface immediately adjacent the base of a tire associated with said wheel and said nose-like part is under and in lifting relation to said outwardly projecting part said column extends inclinedly towards said wheel from said base, and means operatively associated with said lifting device for raising said head along the axis of the column so as to lift said wheel.

4. A lifting device for a vehicle wheel, said wheel having an outwardly projecting part associated therewith, comprising a base adapted to rest upon a supporting surface, a substantially linear column carried by the base and extending upwardly therefrom, a head carried by the column at the top of the column, said head having an upwardly directed nose-like part immediately adjacent the axis of the column but offset therefrom and formed to hook beneath said projecting part, said base, column and head being so related to each other that when said base is positioned on said surface immediately adjacent the base of a tire associated with said wheel and said nose-like part is under and in lifting relation to said outwardly projecting part said column extends inclinedly towards said wheel from said base, and means operating between said base and column for raising said head and column along the axis of the column so as to lift the wheel.

5. Lifting mechanism for a load carrying vehicle wheel having a tire and having in the outer face of the wheel a recess which is substantially concentric with the wheel and the marginal surface whereof extends outwardly toward the outer face of the wheel, comprising a detached jack having a base adapted to rest upon a supporting surface, a column extending upwardly from and supported by the base, and a head on the column formed to operatively engage under the inner surface of the recess at a point substantially directly above the wheel axis, said head having a nose-like part formed to hook beneath said marginal surface, said base, column and head being so related to each other that when said base is positioned on said supporting surface immediately adjacent the base of a tire associated with said wheel, said nose-like part engages under and in lifting relation to said marginal surface, said nose-like part constituting the sole part of said jack which operatively engages the wheel, and means operatively associated with the jack for elevating the head to thereby elevate the wheel.

6. A lifting device for a vehicle wheel, said wheel having an outwardly projecting part associated therewith, comprising a base adapted to rest upon a supporting surface, a column carried by the base and extending upwardly therefrom, a head carried by the column, said head having an upwardly directed nose-like part immediately adjacent the axis of the column but offset therefrom and formed to hook beneath said projecting part, said base, column and head being so related to each other that when said base is positioned on said surface immediately adjacent the base of a tire associated with said wheel, said nose-like part engages under and in lifting relation to said outwardly projecting part, said nose-like part constituting the sole part of said jack which operatively engages the wheel, and means operatively associated with said lifting device for raising said head so as to lift said wheel.

7. A lifting device for a vehicle wheel, said wheel having an outwardly projecting part associated therewith, comprising a base adapted to rest upon a supporting surface, a column carried by the base and extending upwardly therefrom, a head carried by the column, said head having an upwardly directed nose-like part immediately adjacent the axis of the column but offset therefrom and operative to hook beneath said projecting part, said nose-like part being of elongated form the intersection whereof with a plane generally parallel to the plane of rotation of the wheel when the device is in operative relation to a said wheel is generally horizontal, said base, column and head being so related to each other that when said base is positioned on said surface immediately adjacent the base of a tire associated with said wheel, said nose-like part engages under and in lifting relation to said outwardly projecting part, said nose-like part constituting the sole part of said jack which operatively engages the wheel, and means operatively associated with said lifting device for raising said head so as to lift said wheel.

JOSEPH J. MIZER.